Figure 1:
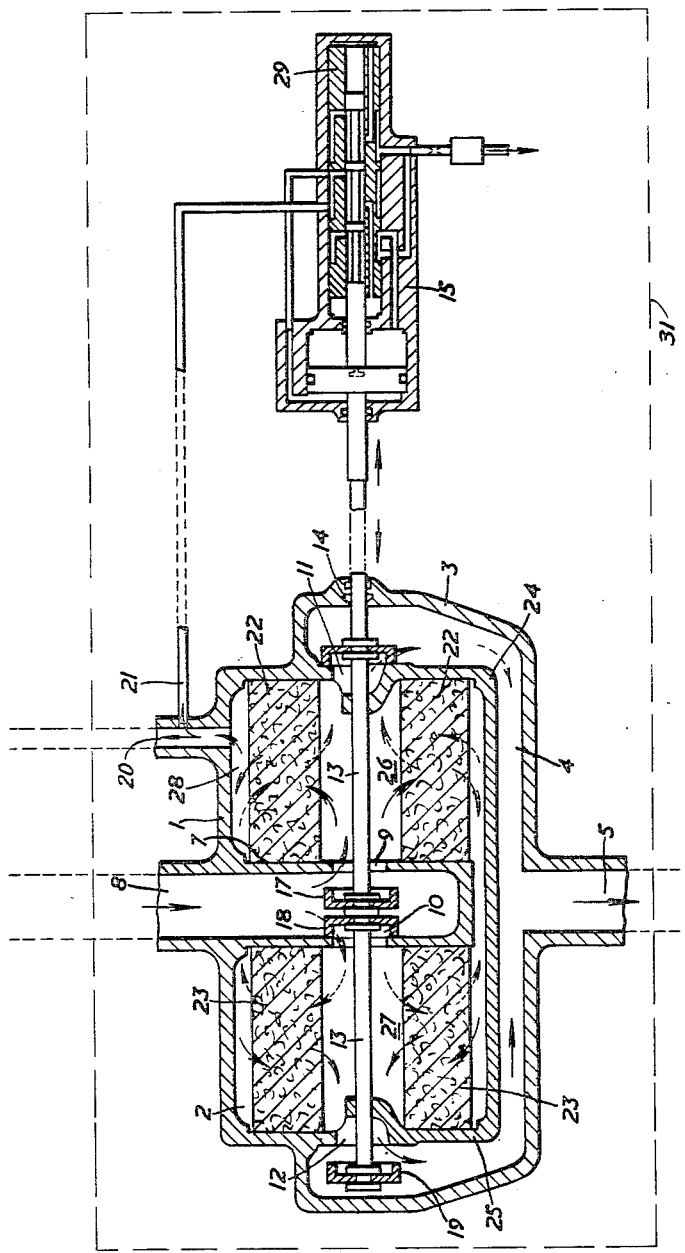

June 14, 1960    J. SKELLERN    2,940,517
FLUID FILTERING APPARATUS
Filed Nov. 9, 1956    2 Sheets-Sheet 1

INVENTOR
JOHN SKELLERN

BY Watson, Cole, Grindle
& Watson
ATTORNEYS

United States Patent Office 2,940,517
Patented June 14, 1960

2,940,517

FLUID FILTERING APPARATUS

John Skellern, Northolt, England, assignor to D. Napier & Son Limited, London, England, a company of Great Britain Filed Nov. 9, 1956, Ser. No. 621,280

Claims priority, application Great Britain Nov. 15, 1955

8 Claims. (Cl. 158—36.4)

This invention relates to fuel supply systems provided with filtering apparatus of the kind in which the fuel to be filtered is caused to travel through passages of restricted cross-sectional area in a filtering wall (hereinafter referred to as a filter element), which wall may be formed, for example, of a felt-like material or of one or more fine metallic gauzes or as a series of closely spaced parallel plates or of a porous ceramic or other material or otherwise.

In such filtering apparatus the solid particles extracted from the fuel by the filter element tend to accumulate upon the surface of the filter element by which the fuel being filtered enters this element. One of the known methods of cleaning a filter element after an accumulation of solid particles has formed on such surface is to "back-wash" the filter element, that is to say to cause fluid to flow through the filter element for a short period in the opposite direction from that in which it flows during normal filtering so as to wash at least the majority of the solid particles from the surface of the filter element on which they have accumulated, the back-washing fluid which then carries the accumulated solid material in suspension being discharged during this operation.

It has moreover been proposed in such filtering apparatus to provide two filter elements which can be brought into use alternatively at will so that when one requires cleaning the other can be brought into use during such cleaning operation. However, such filtering apparatus has not hitherto been used in fuel supply systems owing to the problem of utilizing the dirty fuel used for back-washing.

It is an object of the present invention to provide a fuel system employing a filtering apparatus adapted for back-washing.

It is also an object of the present invention to provide an improved filtering apparatus of the general kind referred to in which a continuing supply of filtered fluid can be obtained while cleaning of the apparatus by back-washing.

Filtering apparatus of the kind referred to according to the present invention comprises two or more filter units, an inlet passage for supplying fluid to the normal inlet side of each unit, a common clean fluid chamber communicating with the normal outlet side of each of said filter units, a clean fluid discharge passage communicating with said clean fluid chamber, at least one dirty fluid discharge passage for the discharge of dirty fluid, and valve means for connecting the normal inlet side of each of the said filter units with its inlet passage while at the same time cutting off the inlet side of the remaining filter unit or one at least of the remaining filter units from its inlet passage and connecting it with its dirty fluid discharge passage.

In a preferred embodiment a common inlet passage is provided for supplying fluid to the inlet sides of the filter units, and/or a common dirty fluid discharge passage is associated with the various filter units and preferably apparatus is included for periodically automatically operating the valve apparatus to connect the normal inlet side of a different filter unit to its inlet passage and the normal inlet side of the other or another filter unit to its dirty fluid discharge passage while cutting off the normal inlet side of such other filter unit from its inlet passage.

In one convenient embodiment the fluid flowing through the filter apparatus is utilized to operate the valve apparatus, such fluid preferably being withdrawn from the clean fluid discharge passage.

In a preferred construction according to the invention each of the filter units is in the form of a tubular filter element the bore of which constitutes the normal inlet side of the unit and the exterior circumferential surface communicates with the clean fluid chamber or vice versa.

According to the invention a fuel supply system for the supply of fuel to the combustion chamber or combustion chambers of an engine of the combustion turbine type comprises a main fuel delivery system arranged to deliver fuel to one or more fuel injection nozzles supplying fuel to the combustion chamber or combustion chambers, a pilot metering system, means whereby the pilot metering system is arranged to control the flow of fuel to the nozzle or nozzles in the main delivery system, and filtering apparatus adapted for backwashing and so arranged that the flow of fuel to the nozzle or nozzles is taken from the dirty fluid discharge passage while the flow of fuel in the pilot metering system is taken from the clean fluid chamber.

Figure 2:
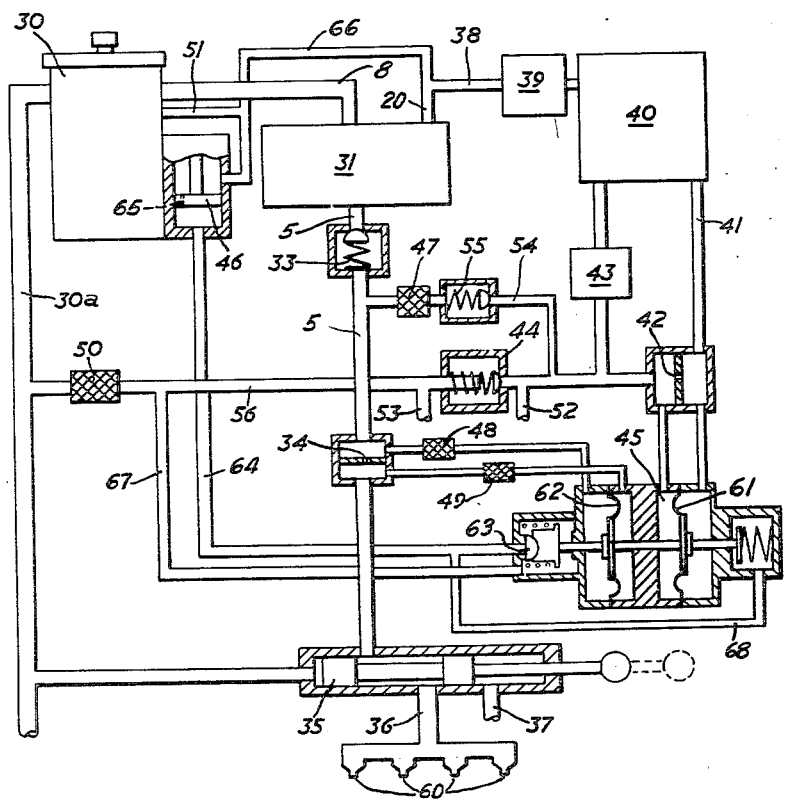

The invention may be performed in various ways but one specific embodiment of the filter apparatus and one liquid fuel metering system employing such a filter will be described by way of example with reference to the accompanying drawings in which:

Figure 1 shows a cross sectional view of cyclic filtering apparatus according to the invention, and Figure 2 shows a fuel system for an internal combustion engine employing such a cyclic filtering apparatus.

The cyclic filtering apparatus shown in Figure 1 comprises a main body portion 1 in which is formed a main chamber 2 around the lower portion of which is arranged a secondary casing 3 forming between its inside surface and the outer surface of the main body portion 1 a common dirty fluid discharge chamber 4. Leading from the said chamber 4 is a dirty fluid discharge passage 5.

A buttress wall 7 is arranged to extend into the main chamber 2 down the centre of which is formed a common inlet passage 8 ports 9 and 10 being formed in the bore of this passage at a point midway in the depth of the main chamber 2. The said ports providing communication between the common inlet passage 8 and main chamber 2. On each of the end walls 24, 25 of the chamber 2 are provided corresponding outlet ports 11 and 12 allowing communication into the dirty fluid discharge chamber 4. The outlet ports 11 and 12 and the inlet ports 9 and 10 are arranged so that a shuttle valve rod 13 may extend through the main chamber and out of the apparatus via a simple labyrinth seal 14 in the outer casing 3 to a self acting reciprocating fluid motor 15 of known type. Arranged on the shuttle valve rod 13 at appropriate positions in relation to the various ports are four valve discs 16, 17, 18, and 19, so that in alternative positions of the shuttle valve rod 13 either ports 9 and 12 are open and ports 10 and 11 are closed (as shown in Figure 1) or ports 10 and 11 are open and 9 and 12 closed.

The fluid motor 15 is operated by fluid taken from the clean fluid chamber 2 via a clean fluid passage 20 and a secondary passage 21.

Filtering in the apparatus is provided by a pair of tubular filter elements 22 and 23 which extend on either side of the buttress wall 7 into close contact with the end walls 24, 25 of the clean fluid chamber 2 the arrangement being such that fluid entering the apparatus through the common inlet passage 8 and either of the ports 9 or 10 enters either the bore 26 or bore 27 of one other of the filters 22, 23, respectively, and must pass through one or other of the filters to enter a common clean fluid chamber constituted by the part 28 of the main chamber 2. It will be seen that the bore of each filter element constitutes the normal inlet side of the element and the outer circumferential surface the normal outlet side.

In operation the apparatus works as follows: Fluid to be filtered enters the apparatus through the common inlet passage 8 and passes through one of the inlet ports 9 or 10 for example inlet port 9 as shown in Figure 1. As outlet port 11 is closed by valve disc 16 the fluid must pass through filter element 22 into part 28 of the main chamber 2. A portion of this cleaned fluid may now be withdrawn from the clean fluid chamber 28 by way of the clean fluid discharge passage 20 a small amount of it being tapped therefrom to operate the fluid motor 15. The remainder of the cleaned fluid now passes through filter element 23 from its outer surface to its inner bore 27 from whence it may escape through outlet port 12 into the common discharge chamber 4 and the dirty fluid discharge passage 5. When the shuttle valve is in its alternative position the fluid to be filtered will enter the bore 27 of filter element 23 from the common inlet passage 8 pass through each of the filters elements in the reverse direction and enter the common discharge chamber 4 through outlet port 11. To help the reader to understand the direction of fluid flow in each of the alternative shuttle valve positions fluid flow direction lines have been added to the drawing. The solid direction lines indicate the fluid flow when the shuttle valve is in the position shown in Figure 1 and the broken direction lines indicate the direction of fluid flow when the shuttle valve is in its alternative position and the ports 9 and 12 are closed.

It will be appreciated from the above description that clean fluid flowing through one or other of the filter elements from part 28 of the main chamber 2 into the bore of the filter element will "back-wash" that particular element so removing from the inner bore of the filter any solid particles previously deposited there by fluid to be filtered entering the clean fluid chamber, such solid particles being carried out of the apparatus through the dirty fluid discharge passage 5. It will also be clear from the drawing that only filtered fluid can be withdrawn from part 28 of the main chamber 2 even during the overlap period between opening periods of the parts when the inlet port of both elements are both temporarily connected to the common inlet pasage 8 and the outlet ports 11 and 12 are both temporarily connected to the common dirty fluid discharge chamber 4.

The rate of pulse of the fluid motor 15 can be controlled by means of restrictors in any or all of its feed passages and the length of dwell at the end of each stroke can be controlled by similarly restricting the rate of response to the sliding valve 29, in known manner.

In the fuel metering system shown in Figure 2 unfiltered fuel is delivered at pressure by a variable delivery pump 30 drawing fuel from a main fuel supply line 30a to a cyclic filter 31 of the type described above and shown in Figure 1, fluid from the dirty fluid discharge passage of such filter passing into passage 5 and to the fuel burners 60 of the engine via a pressurising valve 33, a main flow control orifice 34, and a valve 35 (referred to herein as the cut off and dump valve) passage 36 of which leads to the burners indicated diagrammatically at 60, and passage 37 of which leads to atmosphere.

Filtered fuel withdrawn from the clean fluid discharge passage 20 of the cyclic filter passes through a passage 38 to a constant flow metering unit 39 of the type described in the applicant's United States Patent Number 2,802,335 which meters a constant flow sufficient for the combined needs of the pilot metering system described hereunder and any servo devices also operating on clean fuel. The unit 39 is of known kind providing a constant fuel flow at any given engine speed. The fuel from this unit passes to a unit 40 similar to the fuel metering unit described in U.S. patent application Serial No. 551,620, filed December 7, 1955, in the names of R. H. D. Chamberlin and the present applicant, and now abandoned. Unit 40 serves to cause delivery through a pipe 41 of a predetermined percentage of the total fuel required by the engine as determined, for example, by the compressor inlet temperature, the position of the pilot's manual control lever, and the compressor inlet pressure, the remainder of the fuel which is delivered by the unit 39 passing through a conventional spill valve 43. The fuel flowing through the passage 41 is therefore proportional at all times to that which is to flow to the engine. The fuel flowing through the passage 41 passes through a pilot flow orifice 42 into the same pipe as the fuel which has flowed through the spill valve 43, and the whole of this fuel then passes through a valve 44 constructed so as to maintain a constant pressure drop across it. After flowing through the valve 44 the fuel is returned by the passage 56 to the pump 30.

A flow proportioning device 45 of known type incorporates diaphragms 61, 62 subject respectively to the respective pressure drops across the pilot flow orifice 42 and the main flow orifice 34, and controls a bleed valve 63 which varies the pressure in conduit 64 and hence the pressure below the operating servo piston 46 of the variable capacity pump 30, so controlling the output of the pump that the pressure drop across the main flow orifice 34 always matches that across the pilot flow orifice 42. This control of the volumetric delivery of the pump inherently controls the rate of delivery of the fuel to the burners 60. The piston 46 is formed with a restricted through drilling 65, and clean fuel is supplied to the upper side of said piston via passage 66 communicating with passage 20. The fuel passing from valve 63 is returned to the inlet side of the pump via passage 67. The device 45 is balanced hydraulically by means of a passage 68.

The pressurising valves 33 and 44 guarantee the minimum back pressure, at low flows, necessary for operation of the pump control servo 46 and a supply line 52 for other minor servos is available upstream of pressure valve 44 with a return passage 53 downstream of said valve.

Small filters 47, 48, 49, 50 are provided to prevent the back flow of foreign matter into the filtered fuel circuit during priming.

A supply of clean fuel is available at approximately pump pressure at passage 51 which can be used for operating any "dirt sensitive" mechanism in the variable capacity pump such as an overspeed governor and/or a hydro mechanical r.p.m. signal generator.

A by-pass circuit 54 is also included to achieve quicker filling of the fuel burner lines in the early part of the starting cycle and comprises a spring loaded non-return valve 55 arranged so that fuel may flow through it into the fuel burner passage 32 until the predetermined burner line pressure plus the spring loading equals the pressure in the clean fluid circuit when the valve closes.

As is clearly shown all the sensitive working components of the above fuel metering system are operated on clean filtered fuel which ensures extreme accuracy of working, the operating fuel being constantly filtered through a filter which is always clean, a condition which is quite unobtainable when using a filter of normal type.

What I claim as my invention and desire to secure by Letters Patent is:

1. A fuel supply system for the supply of fuel to an engine of the combustion gas turbine type comprising a series of burners, a main fuel delivery system leading to said burners, control means to control the delivery of fuel to said burners, a pilot fuel metering system, an operative connection between said pilot fuel metering system and said control means, and filtering apparatus adapted for back-washing, said filtering apparatus having a dirty fuel discharge passage communicating with said main fuel delivery system and a filtered fuel discharge passage communicating with said pilot metering system.

2. In combination with a fuel system for the supply of fuel to an engine of the gas turbine type, a filtering apparatus adapted for back-washing; said fuel system comprising a series of burners, a main fuel delivery system leading to said burners, control means to control the delivery of fuel to said burners, a pilot fuel metering system, and an operative connection between said pilot fuel metering system and said control means; said filtering apparatus comprising at least two filter units each having a normal inlet side and a normal outlet side, a fuel inlet passage, a common filtered fuel chamber communicating with the normal outlet side of each said filter unit, a filtered fuel discharge passage leading from said common filtered fuel chamber, a dirty fuel discharge passage, valve means for connecting the normal inlet side of at least one said filter unit with said inlet passage while shutting off the normal inlet side of this filter unit from said dirty fuel discharge passage and connecting the inlet side of at least one other filter unit to said discharge passage while shutting off the inlet side of this other filter unit from said inlet passage; means connecting said dirty fuel discharge passage to said main fuel delivery system, and means connecting said filtered fuel discharge passage to said pilot fuel metering system.

3. The combination of a fuel supply system and filtering apparatus claimed in claim 2 including apparatus for periodically automatically opertaing said valve means to connect the normal inlet side of a different filter unit to said inlet passage and the normal inlet side of another filter unit to said dirty fuel discharge passage.

4. The combination of a fuel supply system and filtering apparatus claimed in claim 3, in which the operating apparatus for said valve means comprises hydraulic apparatus operated by filtered fuel from said filtering apparatus.

5. Fuid filtering apparatus comprising a body defining a generally cylindrical main chamber, cylindrical filter units of annular cross section having axial bores therethrough, said units being co-axially disposed within said chamber in radially inwardly spaced relation to the cylindrical inner surface of the chamber to therewith define a filtered fluid chamber around and common to said filter units, an inlet passage defining member extending between and across the axial bores of adjoining filter units to maintain said bores normally out of relative communication, said member being formed with oppositely axially directed inlet ports opening from the inlet passage to the respective bores, the opposite ends of the body being formed with dirty fluid discharge ports axially aligned with the respective inlet ports and communicating with the bores of the respective filter units, a valve rod supported for axial movement through all of the respective ports, and valve elements carried by the rod and positioned thereon for alternate cooperation with the ports which communicate with each said bore responsive to opposite axial movements of the rod, to close the inlet port and open the outlet port of one bore while opening the inlet port and closing the outlet port of the other said bore.

6. Fluid filtering apparatus as claimed in claim 5 including apparatus for periodically automatically operating the valve rod to connect the normal inlet side of a different filter unit to said inlet passage and the normal inlet side of another filter unit to its dirty fluid discharge passage while cutting off the normal inlet side of such other filter unit from its inlet passage.

7. Fluid filtering apparatus as claimed in claim 6, in which the operating apparatus for the valve apparatus is arranged to be operated by fluid flowing through the filter apparatus.

8. Fluid filtering apparatus as claimed in claim 7, in which the operating apparatus is arranged to be operated by fluid flowing from the filtered fluid chamber.

References Cited in the file of this patent

UNITED STATES PATENTS

| | | |
|---|---|---|
| 2,173,060 | Andrews | Sept. 12, 1939 |
| 2,540,300 | Smith | Feb. 6, 1951 |
| 2,667,272 | Tursky | Jan. 26, 1954 |
| 2,782,769 | Best | Feb. 26, 1957 |